United States Patent [19]
Rief et al.

[11] Patent Number: 5,957,508
[45] Date of Patent: Sep. 28, 1999

[54] SEALING DEVICE

[75] Inventors: Peter Rief, Sonthofen; Michael Hellebrandt, Burgberg, both of Germany

[73] Assignee: Robert Bosch GmbH, Stuttgart, Germany

[21] Appl. No.: 08/912,599

[22] Filed: Aug. 18, 1997

[30] Foreign Application Priority Data

Aug. 16, 1996 [DE] Germany ............................ 196 32 956

[51] Int. Cl.⁶ ................ F16L 5/00; F16L 17/00; F16L 17/06
[52] U.S. Cl. .................... 285/212; 285/349; 277/609; 277/611
[58] Field of Search ............................ 277/608, 609, 277/611, 616, 625, 619, 630, 637, 638, 644; 285/349, 350, 212, 220

[56] References Cited

U.S. PATENT DOCUMENTS

| | | | |
|---|---|---|---|
| 2,499,024 | 2/1950 | Holladay | 285/350 X |
| 2,777,282 | 1/1957 | Pirquerez | 277/644 X |
| 4,469,338 | 9/1984 | Legris . | |
| 4,490,576 | 12/1984 | Bolante | 285/154.2 X |
| 4,733,872 | 3/1988 | Sugimura | 277/644 X |
| 5,427,386 | 6/1995 | Breaker | 277/608 |
| 5,553,902 | 9/1996 | Powers | 285/350 |

FOREIGN PATENT DOCUMENTS

| | | |
|---|---|---|
| 0 326 292 A2 | 1/1989 | European Pat. Off. . |
| 207855 | 12/1923 | United Kingdom . |
| 1 504 580 | 3/1978 | United Kingdom . |

Primary Examiner—James R. Brittain
Assistant Examiner—Gary Grafel
Attorney, Agent, or Firm—Edwin E. Greigg; Ronald E. Greigg

[57] ABSTRACT

A sealing device for a fluidtight screw connection. When screwing in a screw to be sealed into a fluid-carrying threaded bore of a component, in order to prevent a rectangular sealing ring from extending into a gap between a radial flange of the screw and the component as a result of tangential stress, the sealing device embodies a rectangular sealing ring having a thinner thickness than a countersink into which the sealing ring is inserted. A radial flange of the screw includes a collar that protrudes into the countersink and elastically compresses the rectangular sealing ring so that the sealing ring rests sealingly against a bottom of the countersink and against the collar of the screw.

22 Claims, 1 Drawing Sheet

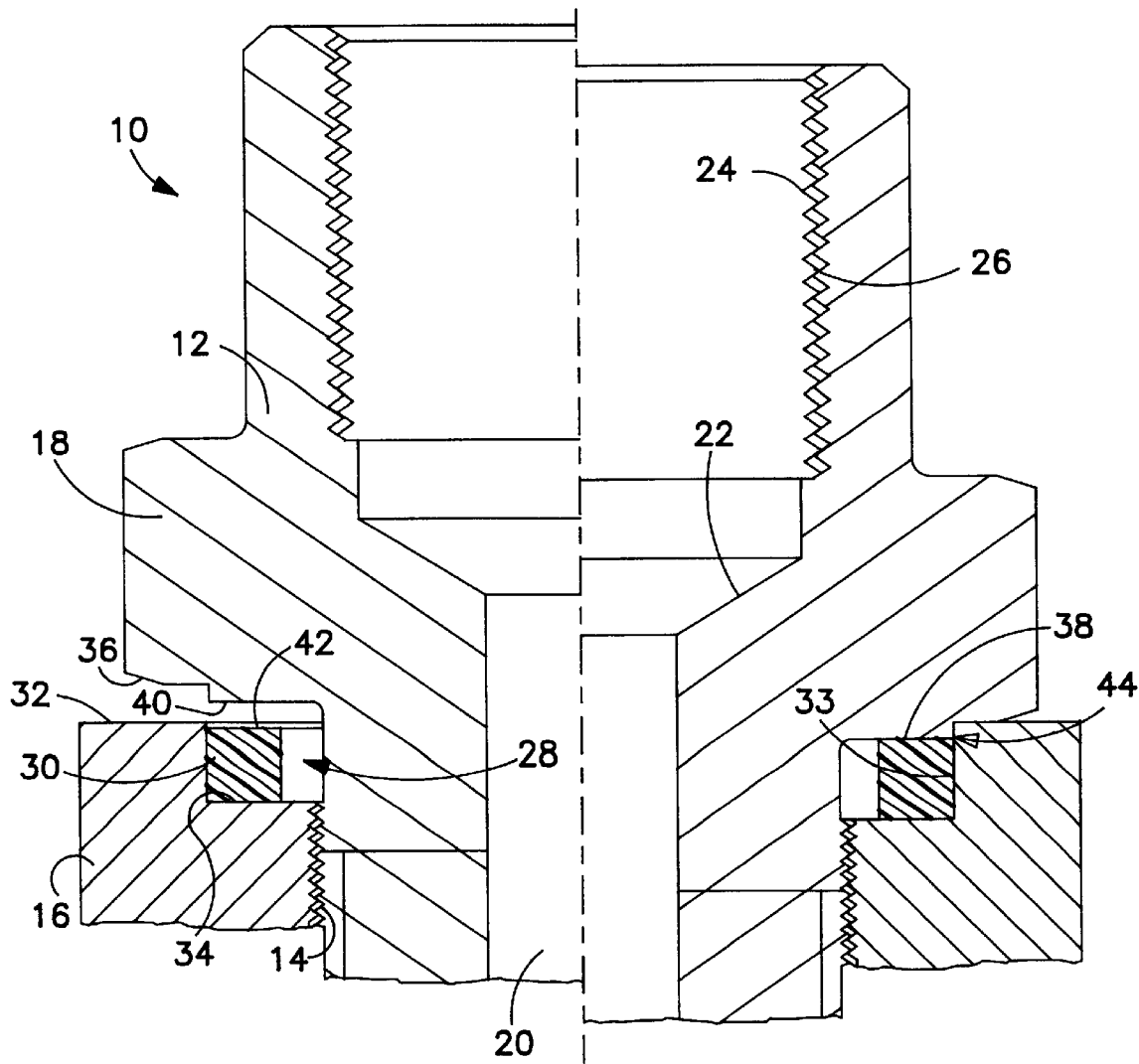

SEALING DEVICE

BACKGROUND OF THE INVENTION

The invention relates to a sealing device for a fluid-tight screw connection to a hydraulic or pneumatic component.

A known sealing device of this kind has a so-called U-seal sealing ring. This is a metal ring into whose hole the actual sealing ring comprised of rubber elastic material is vulcanized. The sealing ring has a trapezoidal ring cross section, wherein the shorter of the parallel trapezoid edges is vulcanized onto the metal ring and the circumferential edges of the sealing ring at the corners of the longer bottom end of the trapezoid cross section constitute protruding sealing lips. The U-seal sealing ring is placed, for example, under the head of a screwed sealing plug or a radial flange of a screw bushing, which is screwed into a fluid-carrying threaded hole of a component. The screw head or the bushing flange mechanically transmits energy onto the component via the metal ring of the U-seal sealing ring. At the same time, the metal ring predetermines the deformation of the actual sealing ring. The actual sealing ring rests against the underside of the screw head or the tubular bushing and against a surface of the component and seals the screw or screw bushing against the component. This type of seal has the disadvantage that the production of the U-seal sealing ring with the metal ring and the vulcanized-on rubber elastic sealing ring is relatively complex and therefore expensive.

Furthermore, it is known to provide the mouth of the internally threaded bore in the component with a countersink into which a rubber elastic sealing ring is inserted that protrudes beyond the surface of the component, for example an O-ring or a rectangular sealing ring. When the screw or bushing is screwed in, the sealing ring is elastically compressed onto a bottom of the countersink and therefore rests sealingly against the bottom of the countersink and against the underside of the screw head or the bushing flange. The energy is transmitted from the underside of the screw head or the bushing flange directly onto the surface of the component. This sealing device, though, has the disadvantage that when the screw or screw bushing is screwed in, the sealing ring is stressed in the tangential direction, by means of which in particular, a rectangular sealing ring can reach into a gap between the underside of the screw head or bushing flange and the component and can get caught there, which damages the sealing ring. Furthermore, the jammed sealing ring causes an extrusion gap into which the pressurized sealing material flows, which quickly leads to the failure of the sealing device. Moreover, the friction when the screw or screw bushing is tightened, and thereby the starting torque, changes as a result of the sealing material caught between the underside of the screw head or the bushing flange and the component, which can likewise lead to the failure of the sealing device. An O-ring can become twisted as a result of the tangential force when screwing in the screw or the screw bushing, which likewise impairs its sealing function and can lead to the destruction of the O-ring.

OBJECT AND SUMMARY OF THE INVENTION

The sealing device according to the invention has a countersink at the mouth of the internally threaded bore, which is as deep or deeper than the inserted sealing ring is thick. Therefore in the unstressed state, the sealing ring does not protrude beyond the surface of the component and is therefore contained by the countersink over its entire height. As a result, the sealing ring is prevented from being deformed into the gap between the screw head or bushing flange and the component due to the tangential force acting on it when the screw or screw bushing is screwed in and is thus prevented from getting caught in this gap. In order to prestress the sealing ring so that it rests sealingly against the underside of the screw head or bushing flange and the bottom surface of the countersink, the underside of the screw head or bushing flange has a collar which, when the screw or screw bushing is screwed in, reaches into the countersink of the component, compresses the sealing ring, and as a result, prestresses it. In this manner, a reliable, high pressure-tight seal is produced with a simple sealing ring.

Advantageous improvements of the sealing device are set forth hereinafter.

The sealing ring of the sealing device according to the invention is preferably a rectangular sealing ring. This has the advantage over an O-ring, for example, that it reliably seals even when there are uneven surfaces, i.e. it requires less surface quality at the bottom of the countersink and on the underside of the screw head or bushing flange.

The invention will be better understood and further objects and advantages thereof will become more apparent from the ensuing detailed description of preferred embodiments taken in conjunction with the drawings.

BRIEF DESCRIPTION OF THE DRAWING

The sole FIGURE shows an axial section through a sealing device according to the invention, wherein the left half of the drawing shows a loosely screwed-in state and the right half of the drawing shows a tightened state.

DESCRIPTION OF THE PREFERRED EMBODIMENTS

The sealing device 10 according to the invention, which is shown in the drawing, has a hollow screw 12, which is screwed into a fluid-carrying threaded bore 14 of a component 16, of which only a fragment is shown in the drawing. The hollow screw 12 has a hexagonal flange 18 for the engagement of a wrench, not shown. An underside 36 of the hexagonal flange 18 oriented toward the component 16 constitutes a radially protruding annular shoulder face for bracing the hollow screw 12 with the component 16.

An axial bore 20 of the hollow screw 12 widens with a sealing cone 22 and immediately after this, transitions into a cylindrical end section 24, which is provided with an internal thread 26 for the purpose of being screwed together in a fluid-tight manner with a tube line, not shown, that has a standard cutting ring.

A countersink 28 with a rectangular cross section is let into a mouth of the fluid-carrying threaded bore 14 and a sealing ring 30 with a rectangular ring cross section (rectangular sealing ring 30) is inserted into this countersink. In the axial direction, the rectangular sealing ring 30 is not as thick as the countersink 28 is deep, i.e. it is disposed beneath a surface 32 of the component 16 even when the hollow screw 12 is not tightened (left half of the drawing. The countersink 28 is at least as deep as the sealing ring 30 is thick in the axial direction. The sealing ring 30 is therefore contained over its entire height by a circumferential wall 33 of the countersink 28 and cannot be displaced in the radial direction out of the countersink 28 when the hollow screw 12 is screwed in and tightened.

In the non-deformed state, an outer diameter of the rectangular sealing ring 30 is greater than a diameter of the countersink 28 so that the rectangular sealing ring 30 is held in the countersink 28 by means of a clamping force in order to keep the rectangular sealing ring 30 from falling out when the hollow screw 12 has not yet been screwed in.

A washer-shaped bottom 34 of the countersink 28 constitutes a first sealing face of the sealing device 10. The underside 36 of the hexagonal flange 18 of the hollow screw 12, which underside is oriented toward the component 16 and constitutes an annular shoulder face, has a collar 38 whose end face 40 constitutes a second sealing face of the sealing device 10. The collar 38 has a clearance fit in relation to the countersink 28 in order to compensate for deviations from a true thread. When the hollow screw 12 is tightened, the collar 38 protrudes into the countersink 28 and elastically compresses the rectangular sealing ring 30 in the axial direction by a particular amount, which is determined by the thickness of the rectangular sealing ring 30, the depth of the countersink 28, and the height of the collar 38. As a result, when prestressed, the rectangular sealing ring 30 rests sealingly against the three sealing faces 33, 34, 40 of the sealing device 10.

In order to keep a tangential force small when tightening the hollow screw 12 onto the rectangular sealing ring 30, a sliding means is provided between the sealing face 40 and the sealing ring 30. The sliding means is affixed, for example, to the end face 42 of the sealing ring 30 oriented toward the sealing face 40 of the hollow screw 12, and/or the sliding means can also be provided on the sealing face 40. An outer edge of the rectangular sealing ring 30 oriented toward the collar 38 can be provided with a bevel 44 or can be rounded in order to prevent the material of the rectangular sealing ring 30, when pressurized, from flowing into an axial gap between the outer circumference of the collar 38 on the underside 36 of the rectangular flange 18 of the hollow screw 12 and the circumference wall 33 of the countersink 28.

The sealing ring 30 is comprised of an elastic material, preferably of rubber or an elastic plastic.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A sealing device for a fluid-tight screw connection, comprising:
    a component (16) that has a threaded bore with a countersink (28) extending into a mouth of the threaded bore, a washer-shaped bottom face (34) of the countersink constitutes a first sealing face of the sealing device,
    a screw-in element (12) that is screwed into the threaded bore and has a radially protruding annular shoulder face oriented toward the component,
    an annular seal ring (30) that is inserted into the countersink of the component and which rests sealingly against the first sealing face, a circumferential wall (33) of the countersink, and against a collar (38) of the screw element that protrudes axially from an annular shoulder face (36) of the screw element, the countersink (28) in the component (16) is at least as deep as the annular seal ring (30) is thick, an end face of said collar constitutes a second sealing face (40), the collar (38) protrudes into the countersink (28) in the component (16) and the collar (38) sealingly presses the annular seal ring (30) against the first and second sealing faces (34, 40) and the circumferential wall (33), radially outside of the countersink (28), the component (16) has a surface (32) oriented toward the screw-in element (12), and once the screw-in element (12) is fully secured to the component (16), the annular shoulder face (36) of the screw-in element rests firmly on the surface (32) (32) radially outside the axially protruding collar (38) to prevent any portion of the seal ring to be exposed to the outside of the device.

2. A sealing device according to claim 1, in which the annular seal ring (30) has a rectangular ring cross section.

3. A sealing device according to claim 2, in which the annular seal ring (30) has a bevel (44), on a rounded part, on an upper, outer edge oriented toward the collar (38) of the screw-in element (12).

4. A sealing device according to claim 1, in which the annular seal ring (30) is comprised of an elastic material.

5. A sealing device according to claim 2, in which the annular seal ring (30) is comprised of an elastic material.

6. A sealing device according to claim 3, in which the annular seal ring (30) is comprised of an elastic material.

7. A sealing device according to claim 1, in which an outer circumference of the collar (38) of the screw-in element (12) has a clearance fit in relation to a diameter of the countersink (28) of the threaded bore (14) in the component (16).

8. A sealing device according to claim 2, in which an outer circumference of the collar (38) of the screw-in element (12) has a clearance fit in relation to a diameter of the countersink (28) of the threaded bore (14) in the component (16).

9. A sealing device according to claim 3, in which an outer circumference of the collar (38) of the screw-in element (12) has a clearance fit in relation to a diameter of the countersink (28) of the threaded bore (14) in the component (16).

10. A sealing device according to claim 4, in which an outer circumference of the collar (38) of the screw-in element (12) has a clearance fit in relation to a diameter of the countersink (28) of the threaded bore (14) in the component (16).

11. The sealing device according to claim 1, in which an outer diameter of the annular seal ring (30) is greater than the diameter of the countersink (28).

12. The sealing device according to claim 2, in which an outer diameter of the annular seal ring (30) is greater than the diameter of the countersink (28).

13. The sealing device according to claim 3, in which an outer diameter of the annular seal ring (30) is greater than the diameter of the countersink (28).

14. The sealing device according to claim 4, in which an outer diameter of the annular seal ring (30) is greater than the diameter of the countersink (28).

15. The sealing device according to claim 7, in which an outer diameter of the annular seal ring (30) is greater than the diameter of the countersink (28).

16. The sealing device according to claim 1, in which a sliding means is provided between the collar (38) of the screw-in element (12) and the annular seal ring (30).

17. The sealing device according to claim 2, in which a sliding means is provided between the collar (38) of the screw-in element (12) and the annular seal ring (30).

18. The sealing device according to claim 3, in which a sliding means is provided between the collar (38) of the screw-in element (12) and the annular seal ring (30).

19. The sealing device according to claim 4, in which a sliding means is provided between the collar (38) of the screw-in element (12) and the annular seal ring (30).

20. The sealing device according to claim 7, in which a sliding means is provided between the collar (38) of the screw-in element (12) and the annular seal ring (30).

21. A sealing device as set forth in claim 1, in which said screw-in element (12) includes an axial bore (20), and a portion of said axial bore is provided with internal screw threads (26).

22. A sealing device as set forth in claim 21, in which an upper portion of said axial bore widens with a sealing cone (22) outwardly of said sealing cone, said bore transitions into a cylindrical end section, and said cylindrical end section includes said internal screw threads.

* * * * *